March 2, 1965
K. W. KLEIN ETAL
3,171,920
MOTOR OPERATING MECHANISM FOR USE WITH AN
ELECTRIC CIRCUIT BREAKER
Filed Nov. 8, 1962
5 Sheets-Sheet 1
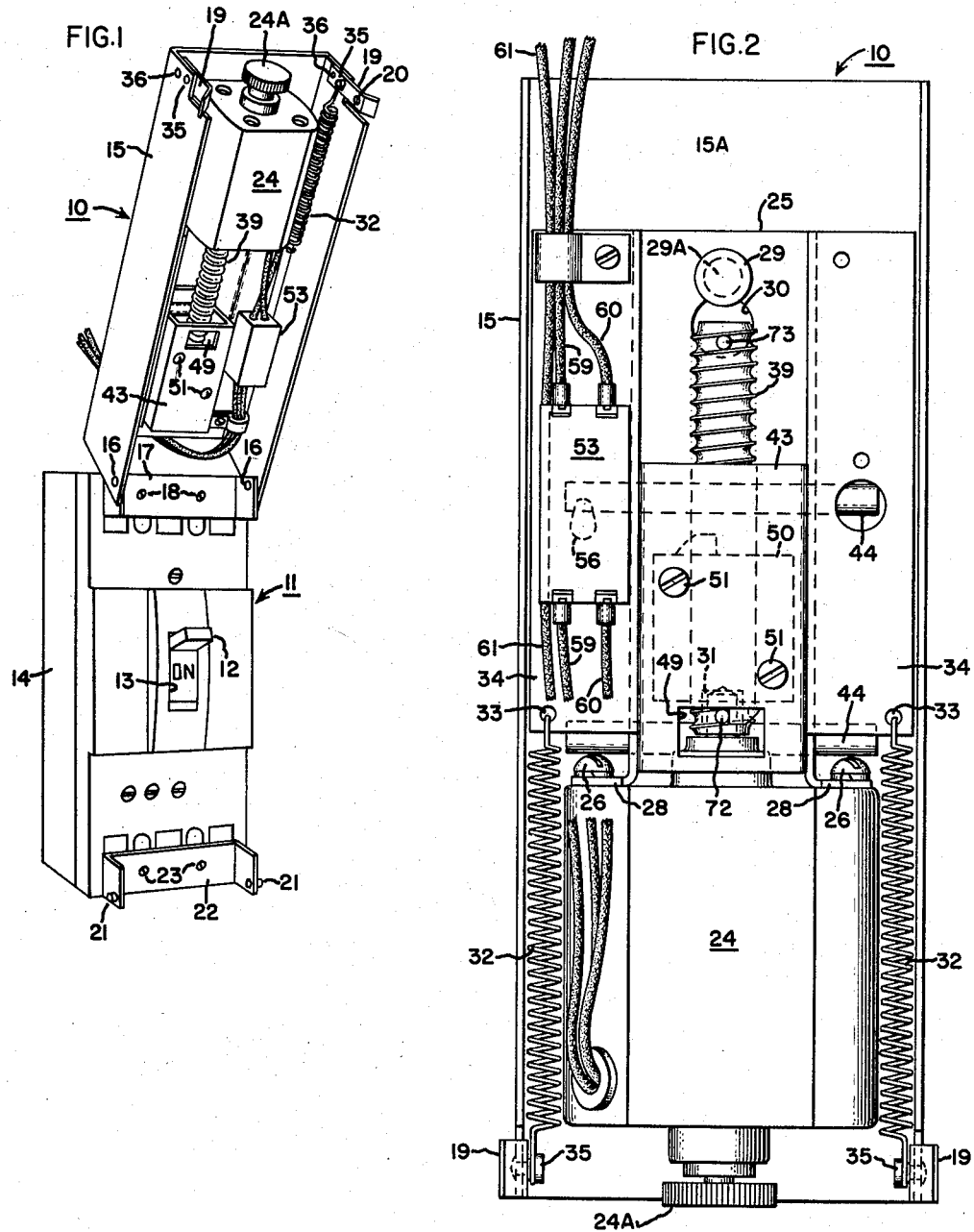
INVENTORS:
DAVID B. POWELL,
KEITH W. KLEIN,
BY Robert F. Carey
THEIR ATTORNEY.

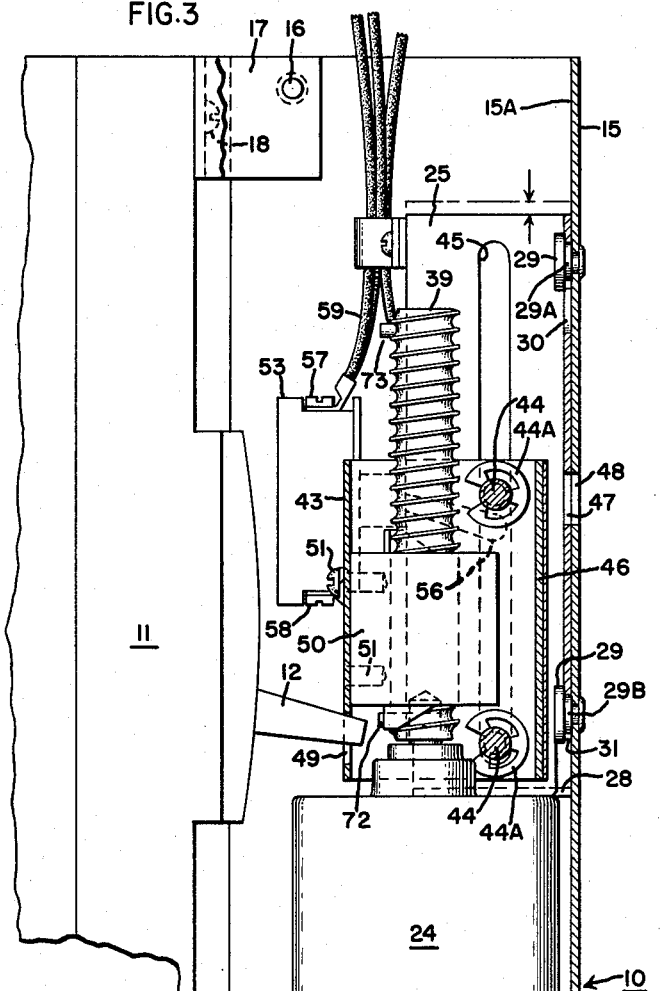
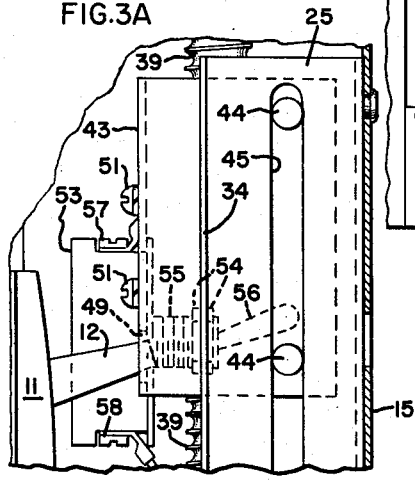
FIG.3
FIG.3A
INVENTORS:
DAVID B. POWELL,
KEITH W. KLEIN,
BY  Robert F. Casey
THEIR ATTORNEY.

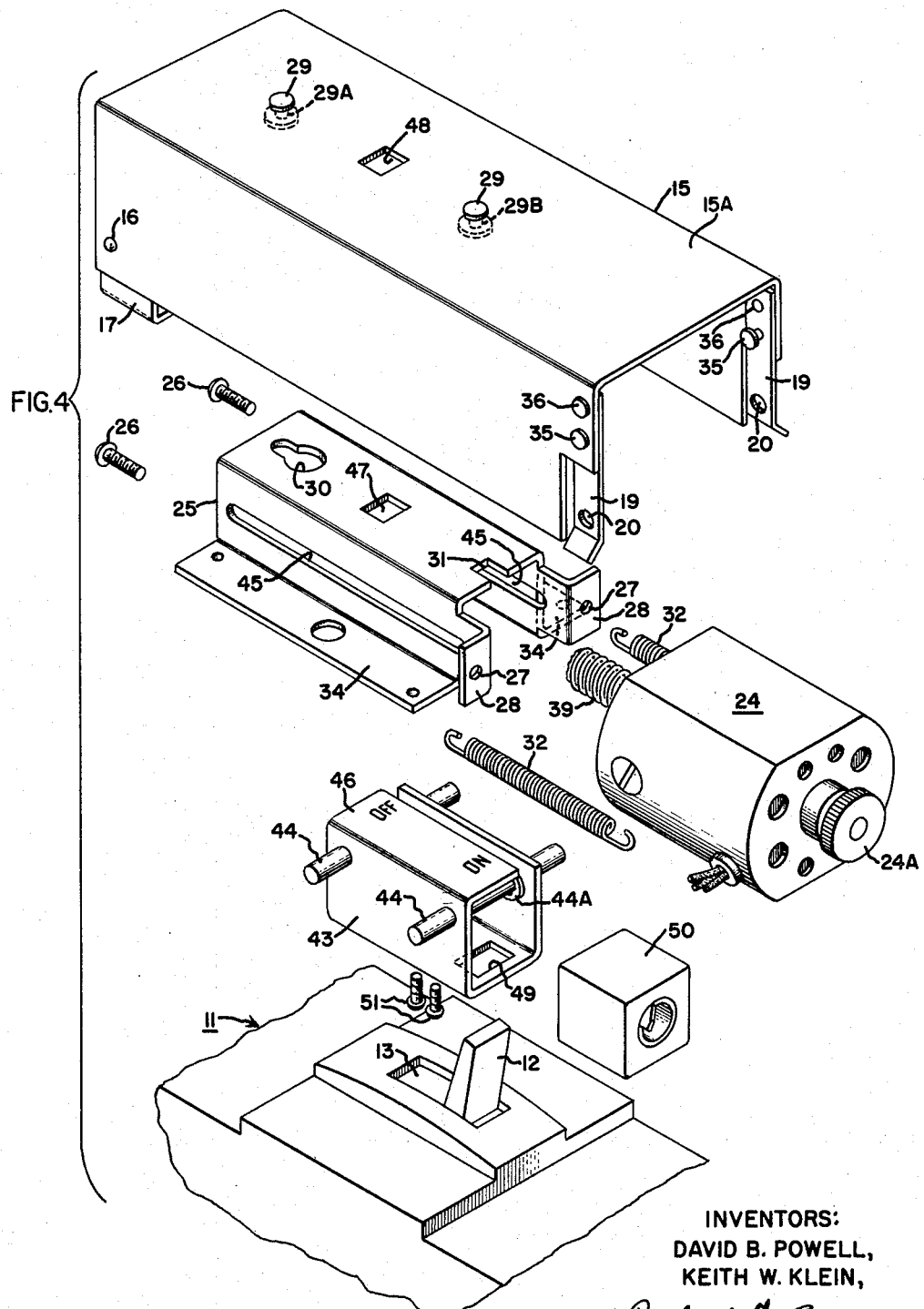

INVENTORS:
DAVID B. POWELL,
KEITH W. KLEIN,

BY Robert A. Casey

THEIR ATTORNEY.

March 2, 1965  K. W. KLEIN ETAL  3,171,920
MOTOR OPERATING MECHANISM FOR USE WITH AN
ELECTRIC CIRCUIT BREAKER
Filed Nov. 8, 1962  5 Sheets-Sheet 5

INVENTORS:
DAVID B. POWELL,
KEITH W. KLEIN,
BY Robert P. Casey
THEIR ATTORNEY.

United States Patent Office 3,171,920
Patented Mar. 2, 1965

3,171,920
MOTOR OPERATING MECHANISM FOR USE WITH AN ELECTRIC CIRCUIT BREAKER
Keith W. Klein, Simsbury, and David B. Powell, Bristol, Conn., assignors to General Electric Company, a corporation of New York
Filed Nov. 8, 1962, Ser. No. 236,318
5 Claims. (Cl. 200—92)

Our invention relates to electric circuit breakers, and particularly to electric circuit breakers of the type having a manually enageable operating handle for permitting manual operation and also electric motor operating mechanism for permitting automatic operation.

Electric circuit breakers of the molded insulating casing type, including a manually engageable operating handle, are frequently used in combination with motor driven actuating means permitting remote control and automatic operation of the circuit breaker. Circuit breakers of the type refered to are in the current range of 200–1200 amperes at 240 or 600 volts. The over-all size of such circuit breakers has been reduced in recent years, and the need for compact and yet reliable motor operating mechanisms for use with such circuit breakers has been increased.

It is an object of the present invention to provide a motor operating mechanism for use with an electric circuit breaker which will be compact and reliable.

It is another object of the invention to provide such a motor operating mechanism which includes means for positively driving the operating handle to the limit of its travel, together with means for dissipating the rotational inertia of the driving motor subsequently, without the use of highly stressed resilient means.

It is another object of the invention to provide a motor operating mechanism for use with an electric circuit breaker which will nevertheless permit manual access diarectly and readily to the operating handle of the circuit breaker.

It is a further object of the invention to provide an electric motor operating mechanism for an electric circuit breaker, which is of the elongated screw and travelling nut type, including simplified bearing structure.

In accordance with the invention in one form, an electric motor operating mechanism is provided including an elongated generally rectangular housing and an electric motor mounted within the housing on a frame which also provides a pair of elongated guiding tracks. The motor includes an elongated driving screw shaft projecting from one end and carrying a travelling nut. The travelling nut is guided in the tracks in the aforesaid frame, and the shaft is loosely coupled to the motor, whereby the elongated shaft maintains itself in alignment with the travelling nut as the nut travels along the tracks.

In accordance with another aspect of the invention, the entire assembly, including the elongated external housing and the driving motor and its supporting frame and the travelling nut are hingedly supported at one end on the circuit breaker, and releasably held at the other end, whereby the entire assembly may be swung away from the circuit breaker to afford access directly to the handle of the circuit breaker for manual operation thereof.

In accordance with a further aspect of the invention, the driving motor and its supporting frame are resiliently movably supported in the external enclosure, whereby when the travelling nut reaches a positive limit to its travel, the motor and its shaft move with respect to the circiut breaker resiliently to actuate a motor shut-off switch, and the travelling nut thereupon assumes an over-running condition, whereby the resilient supporting means is stressed only a predetermined controlled amount.

The invention will be more fully understood from the following detailed description, and its scope will be pointed out in the appended claims.

In the drawings,

FIGURE 1 is a perspective view of a motor operated mechanism supported on an electric circuit breaker and shown in a position in which it is hinged away from the breaker to afford direct manual access to the circuit breaker operating handle;

FIGURE 2 is a plan view of the electric motor operating mechanism of FIGURE 1;

FIGURE 3 is a side elevation view of the electric motor operating mechanism of FIGURE 1, the mechanism being shown in operating position on the electric circuit breaker;

FIGURE 3A is a fragmentary elevation view of a portion of the motor operating mechanism of the invention, showing particularly the mounting of a limit switch;

FIGURE 4 is an exploded perspective view of the motor operating mechanism of FIGURE 1;

Figure 5:
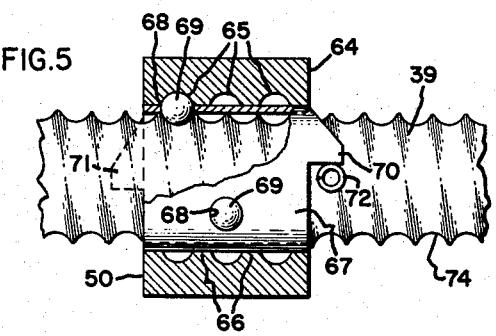
FIGURE 5 is a fragmentary view, partially in section of a portion of the driving screw and the travelling nut used in the invention.

In the drawings, the invention is shown as incorporated in an electric motor operating mechanism indicated generally at 10 and shown in conjunction with a molded case type electric circuit breaker indicated generally at 11.

The electric circuit breaker 11 is of the molded insulating casing type and includes a manually operable handle member 12 which is reciprocally operable within an opening 13 in the cover of the circuit breaker casing 14. The circuit breaker shown has been chosen for illustration purposes only, and it will be understood that the invention may be used with other switches or circuit breakers having a reciprocally operable operating member. The particular circuit breaker illustrated is more fully shown and described in application Serial No. 212,-432, Klein and Powell, filed July 25, 1962, and assigned to the same assignee as the present invention.

The motor operating mechanism of the present invention includes a generally U-shaped housing member 15, which is pivotally supported such as by rivets 16 on a generally U-shaped bracket 17. The bracket 17 is rigidly attached to the circuit breaker casing 14 by suitable means such as by screws 18. The housing 15 is provided with a pair of elongated resilient clips 19 at its forward end, and each clip 19 is provided with an opening 20. The clips 19 are adapted to snap into engagement with a pair of retaining pins 21 carried by a generally U-shaped bracket 22 mounted at the lower end of the circuit breaker, also by suitable means, such as by screws 23, to retain the motor operating mechanism 10 fixedly in position on the top wall of the circuit breaker 11.

Referring particularly to FIGURES 2–4, the motor operating mechanism of the present invention also comprises an electric motor 24, which is rigidly mounted on a supporting frame 25 by suitable means such as by screws 26 passing through openings 27 in outwardly-bent flange portions 28. The supporting frame 25 is slidably supported on the housing 15 by means of enlarged headed rivets 29 mounted on the back wall 15A of the housing 15. For this purpose, the frame 25 is provided with a keyhole-shaped aperture 30 having an enlarged portion large enough to receive the head of one of the rivets 29 and a restricted portion large enough to slidably receive the stem of the rivet 29A. The frame also includes a slot 31 which slidably receives the stem of the rivet 29B.

The frame 25 is resiliently held in mounted position on the rivets 29A, 29B, by means of a pair of tension springs 32, which at one end are hooked into the openings 33 in side flanges 34 of the frame 25, and at the other end are hooked onto headed rivets 35, carried by the housing 15. The rivets 35 also serve, together with rivets 36, to rigidly mount the resilient clips 19 to the housing 15.

Figure 9:
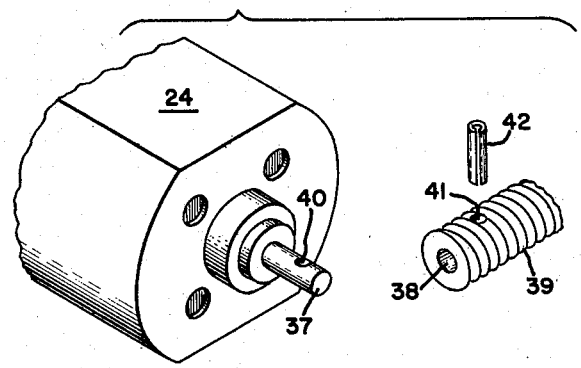
FIGURE 9 is a fragmentary perspective view showing the connection of the drive screw to the motor shaft.

Referring particularly to FIGURE 9, the motor 24 includes an armature shaft extension 37, which is adapted to extend into a central bore 38 of a screw shaft 39. The extension 37 is provided with a transverse opening 40 which is adapted to line up with a corresponding transverse opening 41 in the screw shaft 39 when the parts are assembled. The hole 41 is made of slightly smaller diameter than the hole 40, and the parts are locked together by a resilient pin 42, which fits tightly in the hole 41 but loosely in the hole 40. Also, the bore 38 is made substantially larger in diameter than the shaft extension 37. By reason of this construction, a limited amount of play or wobble is provided between the screw shaft 39 and the motor shaft 37, for a purpose to be described.

The screw shaft 39 extends within the supporting frame 25 and carries a travelling assembly or carriage comprising a generally U-shaped carrier 43 having a pair of transversely extending supporting pins 44 extending therethrough from side-to-side and projecting at each side thereof. The carrier 43 is received between the opposed side wall portions of the frame 25, and the pins 44 extend through, and ride in, a pair of corresponding elongated slots 45 in the side walls of the frame 25. The carrier 43 also includes a bent-over top portion 45 carrying "on" and "off" markings which are visible through the rectangular openings 47 and 48 in the frame 25 and the housing 15 respectively. The carrier 43 also has a rectangular opening 49 in the bottom wall thereof to receive the operating handle 12 of the circuit breaker 11.

The carrier 43 also has a travelling nut 50 rigidly mounted on its back wall by suitable means such as by means of screws 51. The travelling nut 50, which will be described in greater detail below, is supported on and travels along the screw shaft 39, moving the carrier 43 with it.

The rods 44 are retained from sliding movement in the carrier 43 by means of snap-on type washers 44A fitting in corresponding grooves at the inner side wall surfaces of the carrier 43 respectively.

The motor 24 includes at its other end an armature shaft extension carrying an enlarged knob 24A which is knurled to permit manual turning of the armature, and consequently of the screw shaft 39.

Referring particularly to FIGURES 3 and 3A, the carriage assembly comprising the carrier 43 and the travelling nut 50, also includes a miniature switch 53, which is of the double-pole, double-throw type, and which is rigidly mounted on one of the flanges 34 of the frame 25, as particularly shown in FIGURE 3A.

The switch 53 is mounted on the flange 34 by suitable means such as by clamping nuts 54 (see FIGURE 3A) engaging a threaded outlet 55 carried by the switch 53, which also serves to support a toggle type operating handle 56. The switch 53 has two terminals 57 and 58 to which corresponding conductors 59 and 60 are connected (see FIGURE 2). A third conductors 61 leads directly to the motor 24.

The motor 24 is of the reversible "universal" type, having two separate windings, the connections being such that one winding is adapted to be energized when the switch 53 is in one position and the other winding is adapted to be energized when the switch is in its opposite position, the direction of rotation of the motor being reversed accordingly.

The operation of the travelling nut 50 will be understood by reference to FIGURE 5. As shown in this figure, the travelling nut 50 includes a generally rectangular body 64 having a series of circular (not helical) grooves 65 cut therein. Each of the grooves 65 is generally semi-circular in cross-section, and the grooves are spaced axially along the body 64 so as to leave a space or "land" 66 between them. A cylindrical tubular member or "cage" 67 is provided within the body 64. The cage 67 has three holes 68, only one fully shown, which serve to retain three ball bearings 69, only two shown, in predetermined spaced relation. The arrangement is such that the balls 69 each ride in a corresponding groove of the screw shaft 39. It will be observed that while the grooves 69 in the screw shaft 39 are of substantially the same cross-sectional shape as the grooves 65 in the body 50, the grooves 69 are more closely spaced, and form a single continuous helix on the shaft 39. The cage 67 includes projections 70 and 71 at each end respectively for a purpose to be described, and the shaft 39 carries a pair of stop pins 72 and 73 (only 72 shown in FIGURE 5, see FIGURE 3 for 73).

In operation, the nut 50 is restrained from rotation by means of its connection to the carrier 43, which is slidably guided in the frame 25. As the screw shaft 39 rotates, therefore, the nut 50 is moved along the shaft 39. As this occurs, the balls 69 travel around the circular grooves 65, carrying the cage member 67 with them. The cage 67 therefore, rotates relative to the body 50 and relative to the screw shaft 39 as the nut 50 travels along the shaft 39.

Referring to FIGURE 5, and assuming that the nut 50 has been travelling to the right as viewed, such travel continues until the projection 70 of the cage member 67 strikes the stop pin 72 carried by the shaft 39. When this occurs, the cage 67, together with the balls 69, cannot rotate further in the same direction wtih respect to the shaft 39, and remains stationary relative to the shaft 39. Further rotation of the shaft 39 therefore results only in the assembly comprising the cage 67 and the balls 69 rotating within the body 64, the balls 69 travelling around the circular grooves 65 in the body 64. In other words, after the projection 70 strikes the stop pin 72, the shaft 39 continues to rotate without further travel of the nut 50. This action is called "over-running." A similar action takes place at the other extreme of travel of the nut 50, at which time the projection 71 of the cage 67 strikes the stop pin 72 carried by the shaft 39.

*Operation of the motor operated mechanism*

Figure 7:
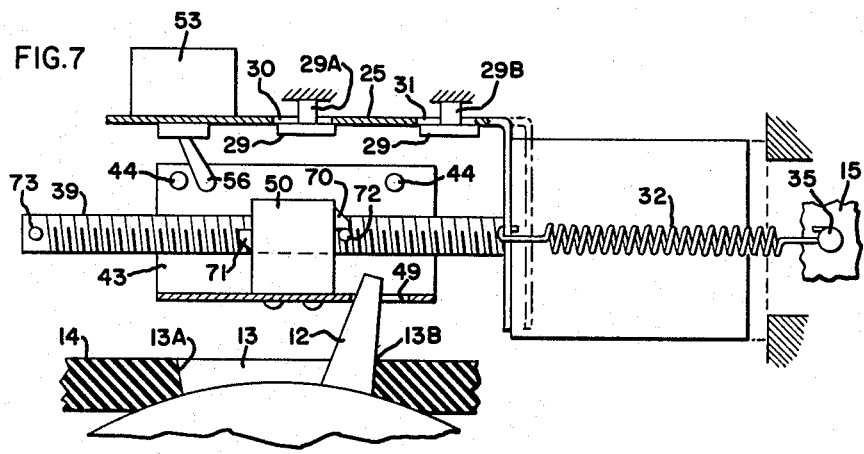
FIGURE 7 is an illustration similar to FIGURE 6, but showing the parts in the condition which they assume after operating the circuit breaker mechanism to "reset" position.
Figure 6:
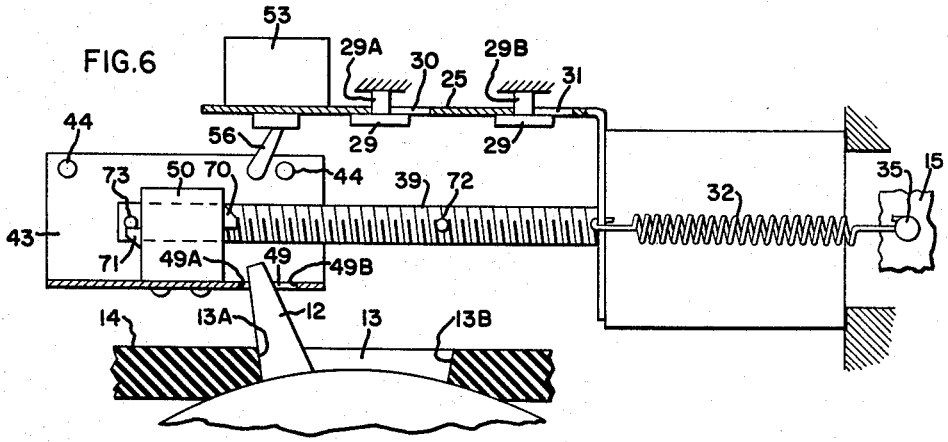
FIGURE 6 is a semi-schematic illustration of the motor operating mechanism of the invention shown in the position in which it assumes after having completed an operation of the circuit breaker to the "on" position.

The operation of the motor operating mechanism will be most readily understood by reference to the semi-schematic FIGURES 6 and 7 and the schematic FIGURE 8.

In FIGURE 6, the parts are shown in the position which they occupy after the motor 24 has moved the nut 50 through an operating cycle to move the circuit breaker handle 12 from "off" to "on" position. In the course of moving the handle from "off" to "on" position, the shaft 39 is rotated by the motor 24 so as to drive the nut 50 to the left as viewed in FIGURE 6. This moves the carrier member 43 to the left as viewed, causing the trailing edge 49B of the opening 49 in the bottom wall of the carrier 43 to engage the trailing side of the operating handle 12 and to move the handle 12 toward "on" position. Since the circuit breaker 11 is of the type incorporating an overcenter snap-acting mechanism, the carrier 43 acts on the handle 12 only long enough to move it past the over-center point, at which time the operating mechanism moves to closed circuit position independently of the speed of the operating handle 12. The operating mechanism then exerts a resilient bias on the handle 12, tending to move it toward full "on" position, in which position the handle is in engagement with the abutment 13A of the circuit breaker casing 14, forming one boundary of the handle opening 13. Since the over-center point of the circuit breaker mechanism is reached a substantial distance before the handle 12 engages the abutment 13A, the limit of travel of the nut 50 in this direction is not critical. The stop pin 73 is therefore set so that the pin 44 of the carrier 43 engages the handle 56 of the switch 53 after the over-center point of the handle 12 has been reached and moves the snap-acting handle 56 over-center to throw the switch 53 to its alternate position, in which the motor is ready for reverse operation. Following movement of the toggle switch handle 56 over-center to the "off" position, the shaft 39 continues to rotate due to the inertia of the high speed motor 24. This carries the nut 50 a short distance farther along the shaft 39 until the projection 71 of the cage 67 engages the stop pin 73 carried by the shaft 39. When this occurs, further rotation, as necessary to dissipate the rotational inertia of the motor 24, merely causes an over-running action but no further axial movement of the nut 50.

It will be noted that in this condition, the handle 12 is or may be completely out of contact with either the leading edge 49A or the trailing edge 49B of the aperture 49 in the carrier 43.

The operation of the device in going from "on" position to "reset" position will be best understood by reference to the schematic diagram of FIGURE 8.

In this connection, it will be understood that the handle 12 of the circuit breaker 11 has two displaced positions one corresponding to "on" position and the other corresponding to the "off" position. In addition, after tripping of the circuit breaker has occurred, it is necessary to reset the circuit breaker by movement of the operating handle in the "off" direction a short distance beyond the "off" position of the handle. In order to be sure, therefore, that the handle is moved by the motor operating mechanism far enough to reset the breaker if it should have been tripped, the travel of the travelling nut 50 is preferably set so as to move the operating handle 12 the maximum possible distance in the "off" direction, that is to the reset position, on every "off" operation. Further, in order to be sure that the reset position of the handle has been reached, the handle 12 is preferably moved in the "off" direction until it abuts solidly against the abutment 13B of the casing cover, as shown in FIGURE 7.

Figure 8A:
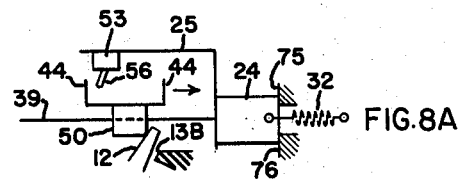
FIGURES 8A–8C are schematic diagrams showing the relationship of the parts during a portion of the operation of the mechanism in moving the handle of a circuit breaker to its reset condition.

Referring now to FIGURE 8, and assuming that an off-operation has been initiated, and that the nut 50 is travelling toward the right, moving the handle 12 in the "off" direction, as the parts approach the end of travel in this direction, the relationship of the parts is as indicated in FIGURE 8A. At this time, the motor 24 is driving the screw shaft 39 through the nut 50 so as to move the nut 50 to the right as viewed. At least the last portion of this movement takes place against the force of the operating springs of the circuit breaker. It will be observed that the reaction of this force on the shaft 39 is such as to tend to move the shaft 39 and the motor 24 toward the left as viewed, against the bias of the springs 32. For this purpose, the springs 32 are preferably chosen so as to have a strength in excess of the force required to reset the circuit breaker 12.

Figure 8B:
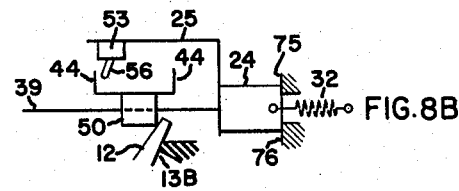

Referring now to FIGURE 8B, it will be observed that when the handle 12 is moved by the nut 50 into engagement with the abutment 13B, the travel of the nut 50 in the right hand direction is positively stopped. It will also be observed that in this position, the rod 44 has not yet moved the operating member 56 of the switch 53 overcenter to shut off the motor. It is of course not desired to shut off the motor 24 until the handle 12 has in fact engaged the abutment 13B. This assures that resetting has been accomplished.

Figure 8C:
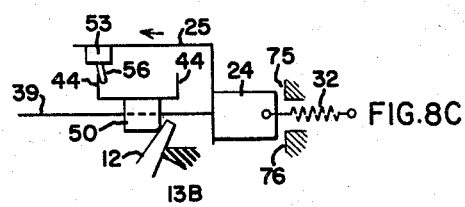

When the travel of the nut 50 in the right hand direction is thus positively stopped, the action of continued rotation of the shaft 39 in the nut 50 tends to thread the shaft 39 through the nut 50 in the left-hand direction, and to pull the shaft and motor to the left as viewed against the bias of the springs 32. As this occurs, the frame 25 is moved, along with the motor 24 and the shaft 39, to the left with respect to the nut 50 and the rods 44. The actuating member 56 of the switch 53 is therefore moved into engagement with one of the rods 44, moving this member over-center to its "off" position. Following movement of the switch 53 to its "off" position as shown in FIGURE 8C, the shaft 39 continues to rotate, due to the stored inertia of the motor 24. The stop pin 72 is therefore set to be engaged by the cage 67 immediately after the shaft 39 has travelled through the nut 50 sufficiently to cause turn-off of the switch 53.

It will be observed in this connection that most of the resilient stressing of the springs 32 occurs before the switch 53 has been turned off. This assures that the handle 12 will positively be moved to the limit of its travel in this direction. At the same time, continued movement of the shaft 39 through the nut 50 after the switch 53 has been turned off, which might result in excessive stressing of the resilient means 32, is prevented by means of the stop pin 72 engaging the cage 67 so as to place the nut 50 in the overrunning condition.

It will be understood that the stops indicated at 76 and 77 in the schematic figures and in FIGURES 6 and 7, are for schematic purposes only, the corresponding function being performed by the leading boundary edges of the apertures 30 and 31 in the supporting frame 25, co-acting with the stems of the guide rivets 29A and 29B carried by the housing 15.

It will also be understood that additional conventional switching means, not shown, is used to energize the selected conductor 59 or 60 as to cause rotation in the desired direction when desired. Thus the switch 53 performs a shut-off function, terminating rotation of the motor in a given direction, and conditioning the circuit so that rotation can occur in the opposite direction upon energizing of the other winding of the motor.

*Manual operation*

When it is desired to operate the circuit breaker 14 by manual engagement with the handle 12, rather than by electrical operation, it is only necessary to spring the resilient clips 19 out of engagement with the pins 21 and to hinge the entire assembly of the motor-operating mechanism upwardly as shown in FIGURE 1, making the handle 12 of the circuit breaker 14 available for manual operation. It is, of course, possible that in this condition, the carriage 43 may be moved so that the aperture 49 is out of register with the handle 12. For this purpose, the armature of the motor is provided with an extension at its outer end on which the knurled knob 24A is mounted. By means of manual rotation of the knob 24A, the carriage 43 and its aperture 49 may be positioned as desired to cause the aperture 49 to register with the operating handle 12.

It will be observed that a motor operating mechanism has been provided which is extremely compact, simple, and effective. Thus for example it will be observed that the motor armature bearing serves as one end bearing for the screw shaft 39; but no outer or outboard bearing as such as required. Instead, the travelling nut 50 is mounted on a carriage 43, which in turn is slidably guided in the frame 25. This serves to maintain the screw shaft 39 in the desired alignment with the armature of the motor 24. In order, that any minor misalignment should not cause any difficulty, the shaft 39 is connected to the armature extension 37 by means as described in connection with FIGURE 9, which permits a substantial amount of angular difference between the axis of the screw shaft 39 and the axis of the extension 37.

While the invention has been shown in only one embodiment, it will be readily apparent that many modifications thereof may readily be made, and it is therefore intended by the appended claims to cover all such modifications as fall within the true spirit and scope of the invention.

It will also be apparent that while the invention has been shown in connection with an automatic-opening electric circuit breaker, and has certain special advantages in such applications, it may also be readily used in connection with any electric switching device which includes an oscillatable handle.

What we claim as new and desire to secure by Letters Patent of the United States is:

1. An electric motor operating mechanism for use with an electric switching device having an oscillatable handle, comprising:
   (a) a rigid support,
   (b) an electric motor mounted on said support for limited sliding movement relative to said support,
   (c) biasing means biasing said electric motor against sliding movement in a first direction,
   (d) said electric motor having an operating shaft projecting from one end thereof,
   (e) an elongated threaded shaft in axial alignment with and having one end connected to and supported by said operating shaft,
   (f) a travelling nut assembly carried by said threaded shaft,
   (g) interengaging means carried by said travelling nut assembly and said housing for supporting and guiding said travelling nut assembly for rectilinear reciprocal movement along said shaft,
   (h) said electric motor and said elongated threaded shaft being moveable a small amount in a direction parallel to the axis of said threaded shaft upon the obstruction of movement of said travelling nut, to cause sliding movement of said motor and said shaft against the bias of said biasing springs,
   (i) a stop carried by said threaded shaft,
   (j) said travelling nut assembly being capable of assuming an overrunning condition upon engagement thereof with said stop carried by said shaft,
   (k) said stop being positioned so as to be engaged by said travelling nut shortly after said motor and said shaft commence said sliding movement, whereby to restrict the stressing of said biasing means to a predetermined amount.

2. An electric motor operating mechanism for use with an electric switching device having an oscillatable handle, comprising:
   (a) an elongated generally rectangular housing having a top wall and opposed side walls,
   (b) a generally U-shaped frame member supported for limited sliding movement in said housing,
   (c) biasing means biasing said frame member in a first direction and against a stop carried by said housing,
   (d) an electric motor rigidly mounted on said frame member and including an operating shaft having its axis extending parallel to said opposed side walls of said U-shaped frame,
   (e) an elongated threaded shaft having one end thereof connected to and supported by said operating shaft of said motor and extending between and parallel to said side walls of said housing, and having its other end unsupported,
   (f) a travelling nut assembly carried by said elongated threaded shaft,
   (g) interengaging means carried by said travelling nut assembly and said U-shaped frame member supporting and guiding said travelling nut assembly for reciprocal rectilinear movement along said threaded shaft,
   (h) handle operating means carried by said travelling nut assembly and adapted to engage said oscillatable handle of said switching device,
   (i) whereby said elongated shaft is supported in part by said motor shaft and in part by said travelling nut assembly.

3. An electric motor operating mechanism for use with an electric switching device having an oscillatable handle, comprising:
   (a) a rigid support,
   (b) an elongated frame member having a back wall and opposed side walls,
   (c) means supporting said frame member for limited sliding movement on said support,
   (d) biasing means biasing said frame member in a first direction against a stop carried by said support,
   (e) an electric motor carried by said frame member and having an operating shaft projecting therefrom, said operating shaft extending parallel to and between said side walls of said frame member,
   (f) an elongated threaded shaft extending parallel to and between said opposed side walls of said frame member, said threaded shaft having one end thereof connected to and supported by said operating shaft of said electric motor and having its other end unsupported,
   (g) a travelling nut assembly carried by said elongated shaft,
   (h) interengaging means carried by said travelling nut assembly and said opposed side walls of said frame member for guiding said travelling nut assembly for reciprocal rectilinear movement along said threaded shaft,
   (i) said threaded shaft being connected to said motor shaft by means permitting appreciable angular deviation between the axis of said threaded shaft and the axis of said motor shaft as said motor shaft rotates.

4. An electric motor operating mechanism for use with an electric switching device having an oscillatable handle, comprising:
   (a) an elongated generally rectangular housing having a top wall, opposed side walls and an open bottom wall,
   (b) an elongated frame member slidably mounted in said housing and including a back wall and a pair of opposed side walls,
   (c) biasing means biasing said frame member in a first direction against a stop carried by said housing,
   (d) a reversible type electric motor carried by said frame member at one end thereof and including an operating shaft having its axis extending parallel to and on a line extending between said opposed side walls of said frame member,
   (e) an elongated threaded shaft extending between said side walls of said frame member and having one end thereof connected to and supported by said motor shaft,
   (g) a travelling nut assembly carried by said threaded shaft,
   (h) interengaging means carried by said travelling nut assembly and said opposed side walls of said frame member for guiding said travelling nut assembly for reciprocal rectilinear movement along said threaded shaft,
   (i) a motor reversing switch carried by said frame member,
   (j) said travelling nut being of the type which assumes an overrunning condition upon engagement thereby of a stop carried by said threaded shaft, (k) a stop carried by said threaded shaft and engageable by said travelling nut when travelling in a first direction,
(l) said reversing switch including an operating member disposed in the path of movement of a portion of said travelling nut assembly,
(m) said switch operating member and said threaded shaft stop member being disposed and arranged so that obstruction of movement of said travelling nut assembly in said first direction when said nut is adjacent said switch operating member causes said motor and said frame member to move linearly in a direction opposite to said first direction whereby to bring said switch operating member into engagement with said travelling nut assembly to be operated thereby, and immediately thereafter to bring said stop member into engagement with said travelling nut assembly to place said travelling nut assembly in said overrunning condition, whereby to limit the amount of stressing of said biasing means to a predetermined controlled amount.

5. An electric motor operating mechanism as set forth in claim 4 wherein said support comprises means for mounting thereof pivotally on said switching device at one end and means for releasably locking said support with respect to said device at the other end, whereby said mechanism assembly may be pivotally moved to a disengaged position to permit direct manual access to said switching device operating member.

References Cited by the Examiner
UNITED STATES PATENTS

| | | | |
|---|---|---|---|
| 2,354,391 | 7/44 | McCourt | 200—92 |
| 2,446,393 | 8/48 | Russell | 318—31 |
| 2,864,912 | 12/58 | Schmidt | 200—92 |
| 2,870,288 | 1/59 | Schmidt | 200—92 |

BERNARD A. GILHEANY, *Primary Examiner.*